H. D. COLMAN & B. A. PETERSON.
DOFFER.
APPLICATION FILED NOV. 5, 1908.

983,858.

Patented Feb. 7, 1911.

H. D. COLMAN & B. A. PETERSON.
DOFFER.
APPLICATION FILED NOV. 5, 1908.

983,858.

Patented Feb. 7, 1911.

Witnesses:
Ed. D. Perry
George L. Chrisdahl

Inventors:
Howard D. Colman
Burt A. Peterson
By Luther L. Miller Atty.

H. D. COLMAN & B. A. PETERSON.
DOFFER.
APPLICATION FILED NOV. 5, 1908.

983,858.

Patented Feb. 7, 1911.

UNITED STATES PATENT OFFICE.

HOWARD D. COLMAN AND BURT A. PETERSON, OF ROCKFORD, ILLINOIS, ASSIGNORS TO HOWARD D. COLMAN, LUTHER L. MILLER, AND HARRY A. SEVERSON, COPARTNERS DOING BUSINESS AS BARBER-COLMAN COMPANY, OF ROCKFORD, ILLINOIS.

DOFFER.

983,858.  Specification of Letters Patent.  Patented Feb. 7, 1911.

Application filed November 5, 1908. Serial No. 461,123.

*To all whom it may concern:*

Be it known that we, HOWARD D. COLMAN and BURT A. PETERSON, citizens of the United States, residing at Rockford, in the county of Winnebago and State of Illinois, have invented certain new and useful Improvements in Doffers, of which the following is a specification.

This invention refers to doffers and applies particularly to a machine for removing the filled bobbins from the spindles of a spinning frame and for placing empty bobbins upon the empty spindles.

One of the objects of this invention is to provide simple means for supporting a doffer upon and operatively connecting it with a spinning frame,—a means which shall utilize features of construction present in the standard spinning frame, and which shall not require any alterations in the construction of the frame.

Another object of the invention is to provide an improved magazine for doffers,—one that is compact, interchangeable, and readily removable from and attachable to the doffer.

Another object is to provide an improved means for feeding bobbins from the magazine to the donning apparatus.

Another object is to provide a shear for severing the thread joining the bobbin with the spindle from which it has been doffed.

A further object is to provide a positive means for placing a bobbin upon a spindle.

A further object of the invention is to produce a doffer which shall be certain in its action, not liable to derangement, and which may be readily handled and operated by a single operative. With this object in view, we have simplified the mechanisms as much as possible, reduced the size and weight of the whole machine, and particularly have reduced the mass of the reciprocating parts to a minimum.

In the accompanying drawings Figure 1 is a side elevation of a doffer embodying the features of our invention. In this figure a portion of the spinning frame is shown in section, and the means for attaching the doffer to the spinning frame is illustrated. Fig. 1ª is a detail view of said attaching means. Figs. 14, 15 and 16 are views illustrating the filled bobbin in the several positions it assumes while being doffed.

In the present embodiment of this invention we have provided a portable machine susceptible of being moved along the sides of a ring spinning frame. The frame of the machine is provided with wheels to enable the operator to roll it about the mill, but when in operation the machine is carried upon a track fixed with relation to the spinning frame. The machine is caused to progress along the spinning frame either by a crank or by direct pressure applied by the operator to the side of the machine. The operative parts of the machine are kept in step with the spinning spindles by means of a star wheel which meshes with the lower ends of the spindle-bases. The machine being relatively small, it can readily be lifted into and out of engagement with the spinning frame and moved along the frame by one operative. In practice the doffer is moved from one spinning frame to another when the bobbins on said frames are ready for the doffing operation, the empty bobbin magazine being replaced by a filled magazine whenever that is necessary in the operation of the machine.

In this specification we will refer to our invention as a doffer, or doffing machine, although it is apparent that said machine performs both the doffing and the donning operation.

In the drawings, 1 refers to a spinning frame, 2 to the bolster rail, 3 to the spindle-bases, 4 to the ring rail, 5 to the thread-guide board, 6 to the thread guides, 7 to the drawing rolls, and 8 to the bobbins containing the roving.

Figure 4:
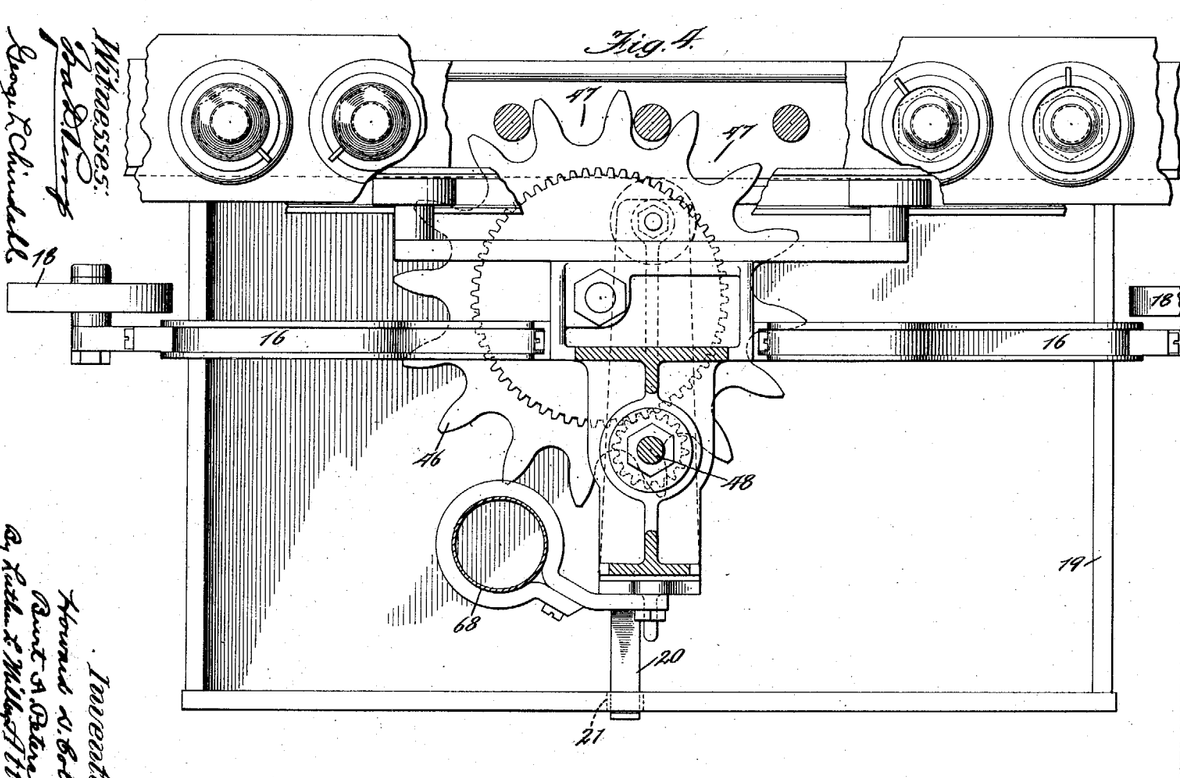
Fig. 4 is a section on dotted line 4 4 of Fig. 1.
Figures 5, 6:
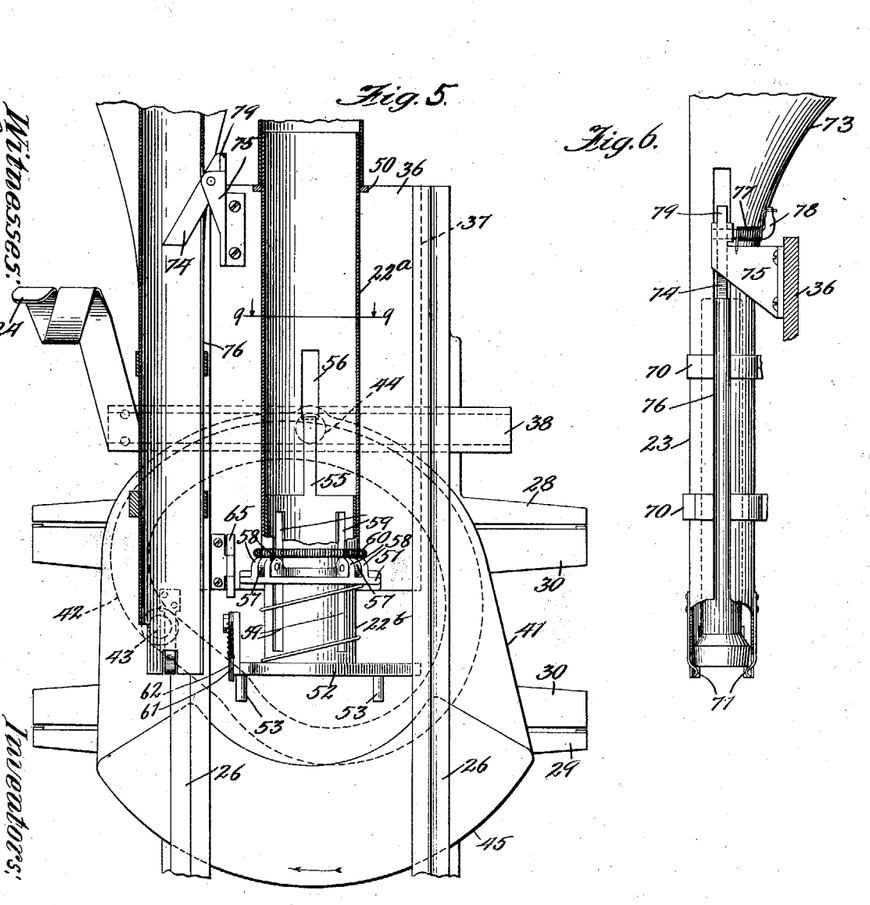
Fig. 5 is a fragmental rear side view, showing the means for moving the doffing tube, the donning tube and the bobbin-seater, the donning tube and a portion of the doffing tube being represented in vertical central section.
Fig. 6 is a fragmentary side elevation of the donner tube, the lower portion of said tube being broken away to illustrate a means for supporting an empty bobbin in said tube.

The embodiment of our invention which has been selected for illustration comprises a carriage, the framework of which is indicated in the drawings, by the numeral 9. The rear side of the carriage, to wit, the side which in operation is toward the spinning frame, has fixed to it an arm 10 which supports at its ends two rollers 11 adapted to run upon a suitable track 12 attached to the bolster rail. This track consists of a channel bar, and it is secured to the spinning frame by means of arms 12$^a$ riveted or otherwise fixed to the bar, the rear ends of said arms being forked to slip onto the spindle-bases 3. The nuts 12$^b$ used in securing the spindle-bases to the bolster rail are utilized in attaching the arms 12$^a$ to said rail, said nuts being turned up against the under sides of said arms. The arms 12$^a$ are provided at sufficiently frequent intervals to support the track 12 rigidly. To hold the carriage upright with relation to the spinning frame, an arm 13 is provided, said arm being rigidly secured to the carriage and carrying a roller 14 arranged to travel along the forward edge of the lower flange 15 of the bolster rail. To adapt the machine to be conveniently moved from one spinning frame to another, it is herein shown as provided with a supporting frame comprising two side members 16 and a connecting bottom member 17. Near their lower ends the side members 16 carry supporting rollers 18. The supporting frame is adapted to receive and carry a box 19 (Fig. 4) into which the filled bobbins are dropped by the mechanism after said bobbins have been removed from the spindles of the spinning frame. The box 19 rests upon the lower bar 17 of the supporting frame and is held in position therein by means of an arm 20 secured to the carriage frame 9, the hooked lower end of said arm engaging in an opening 21 near the upper edge of said box. The box may be readily removed from the doffer by disengaging said box from the hooked arm 20. When the doffer is mounted upon a spinning frame, the rollers 18 and the box 19 are clear of the floor.

Figure 17:
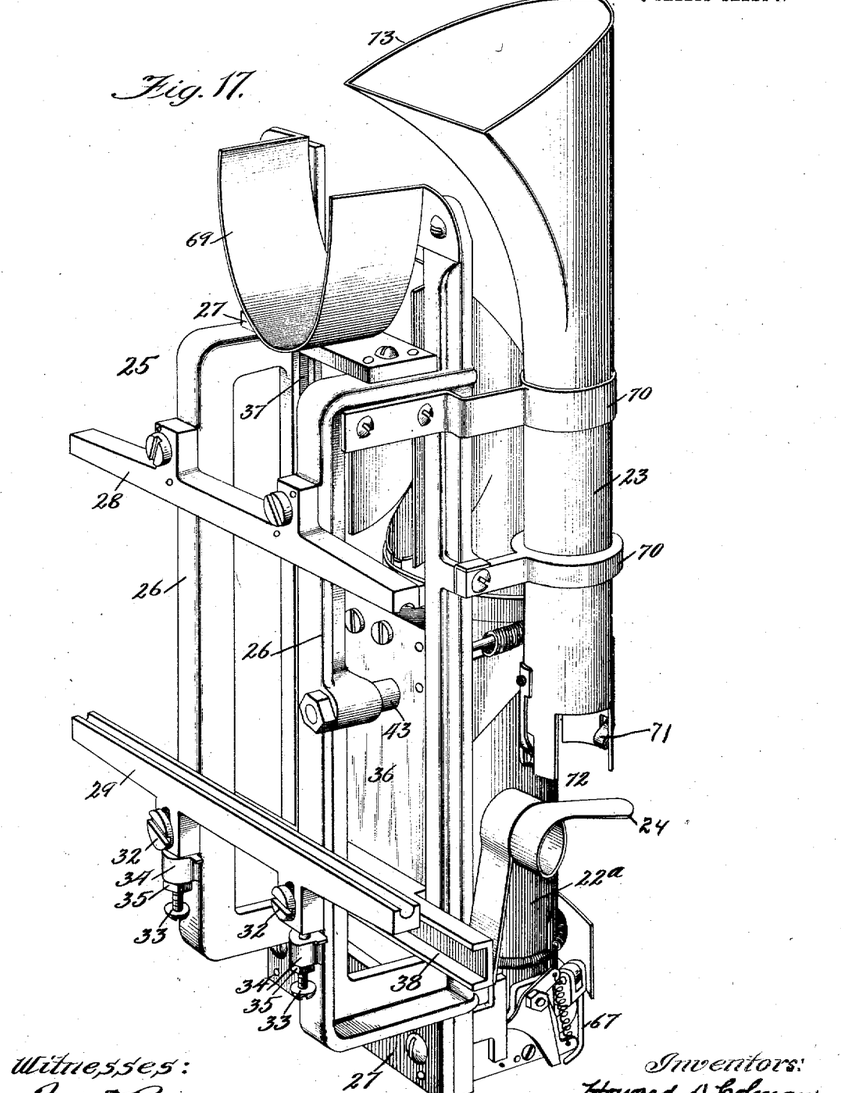
Fig. 17 is a perspective view of the slide that carries the doffing tube, the donning tube and the bobbin-seater, said tubes and bobbin-seater also being shown in said figure.

The carriage 9 supports a doffing tube 22, a donning tube 23 and a bobbin-seater 24, said tubes and bobbin-seater being arranged side by side, the distance between the centers of said tubes, as well as the distance between the center of the donning tube and the operative portion of the bobbin-seater, being equal to the distance between the centers of adjacent spindles. In operation the carriage 9 has a continuous movement along the spinning frame, while the doffing tube has an intermittent movement along the spinning frame, said tube moving downward over a filled bobbin and rising with said bobbin during each pause between the steps of its progressive movement along the spinning frame. The donning tube also moves intermittently along the spinning frame, pausing above each spindle while a bobbin is being ejected from the tube onto said spindle. The movements of the bobbin-seater are similar to those of the doffing tube. To obtain these various movements, we have provided mechanism which is herein shown as comprising a slide frame 25 (Fig. 17) consisting of two side members 26 of open form rigidly secured together at top and bottom by means of two transverse members 27. Upon their forward edges the side members 26 carry transverse bars 28 and 29, said bars having ball races formed on their opposing faces. The carriage frame 9 comprises transverse arms 30 carrying bars 31 providing ball races complementary to the ball races in the bars 28 and 29. The bar 28 is herein shown as fixed to the slide frame 25, while the bar 29 is adjustably mounted in order to permit of an adjustment of the ball bearings for said slide frame. The bar 29 is secured to the slide frame by means of screws 32 extending through elongated openings in said bar. Adjusting screws 33 seated in ears 34 upon the forward edges of the side members 26 bear at their upper ends against the bar 29. These adjusting screws are provided with lock nuts 35.

The doffing tube 22 and the bobbin-seater 24 are carried by a slide plate 36 (Figs. 5, 7 and 17) arranged for vertical movement in guide grooves 37 in the slide frame 25. To the forward side of the slide plate 36 is fixed a horizontally-extending channel bar 38, the bobbin-seater 24 being in this instance attached to one end of said channel bar.

The means herein shown for reciprocating the slide frame 25 horizontally with relation to the carriage frame, and for vertically reciprocating the slide plate 36 with relation to the slide frame 25 comprises a horizontal shaft 39 mounted in the carriage frame. To the outer end of the shaft 39 a crank 40 may be attached, if desired. The inner or rear end of said shaft has fixed thereto a cam disk 41 having in one face a cam groove 42 to receive a roller stud 43 carried by the slide frame 25, and having on its opposite face a roller stud 44 fitting in the channel bar 38.
The weight of the slide plate 36 and the parts carried thereby is counterbalanced by the weighted portion 45 (Fig. 5) of said cam disk. The contour of the cam groove 42 is such that the slide frame 25 is practically stationary with reference to the spinning frame while a filled bobbin is being removed, and an empty bobbin is being placed upon a spindle, and is then given a quick forward movement to place the doffing tube, the donning tube and the bobbin-seater in register with succeeding spindles.

Figures 1, 1A:
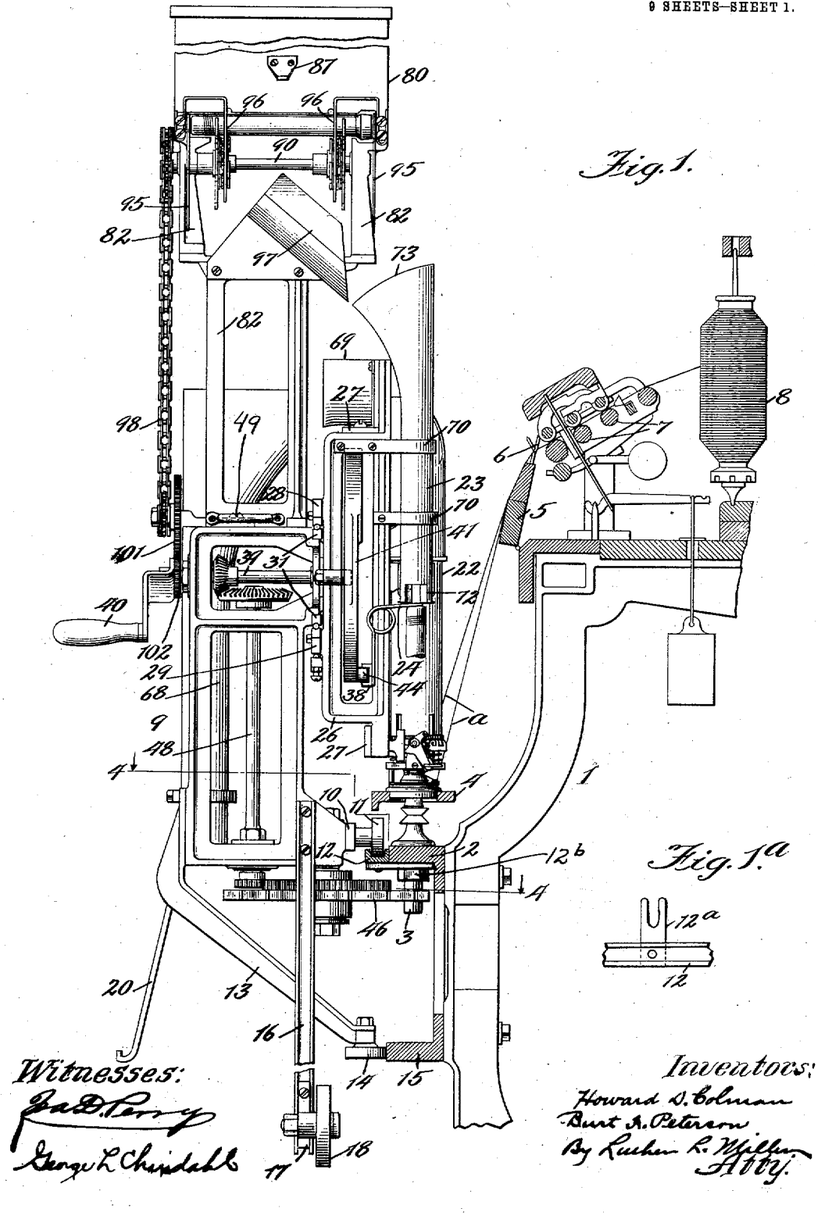
Figure 2:
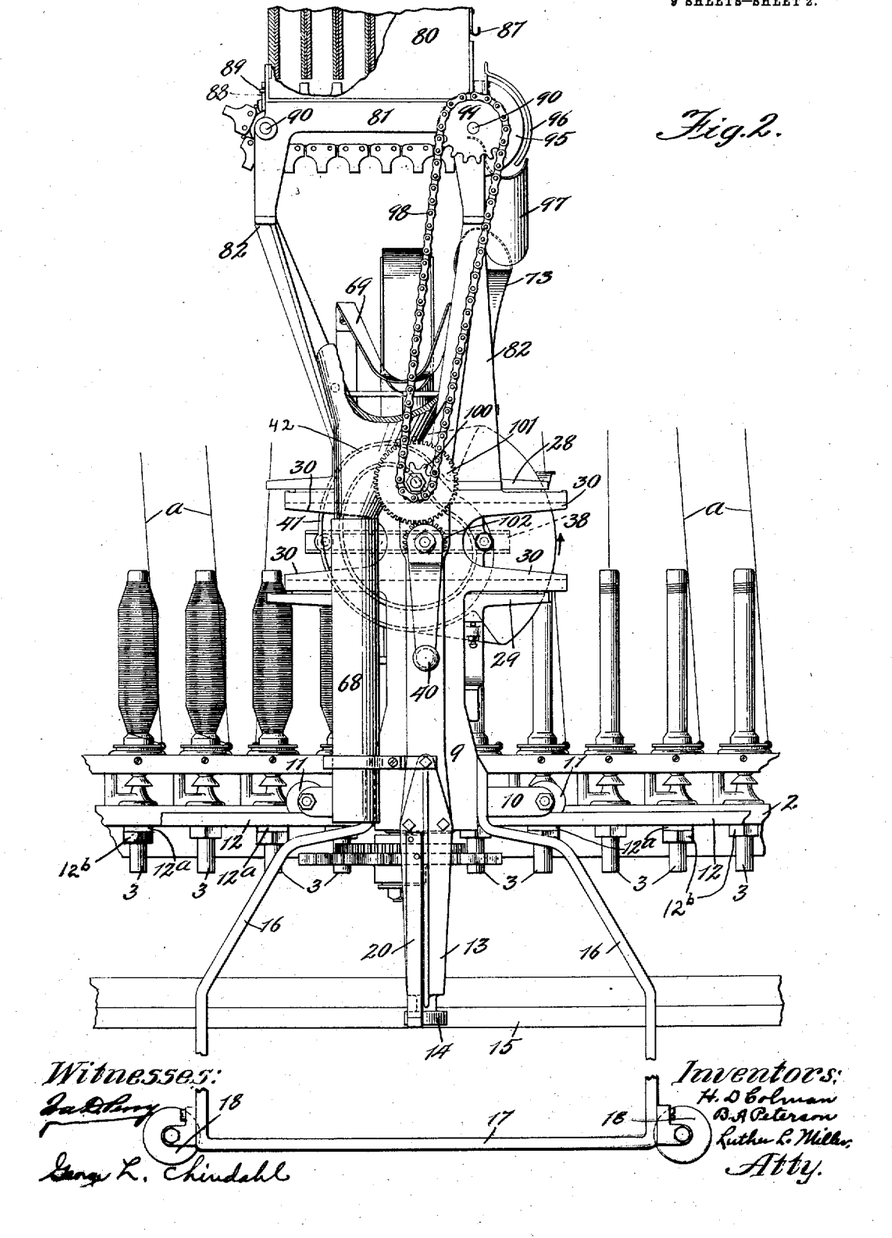
Fig. 2 is a front side elevation of said doffing machine, the upper portion of the bobbin magazine and the lower portion of the doffer being broken away.

The doffing mechanism is kept in step with the spindles by suitable means, as, for example, a star wheel 46 (Figs. 1, 2 and 4) rotatably mounted upon the carriage frame 9 in position to engage the spindle-bases 3 when the doffer is in operative relation to a spinning frame. The star wheel 46 may be provided with double teeth, or in other words, the teeth of the star wheel may be concave, as at 47 (Fig. 4), to clear the rods (not shown) extending vertically of the bolster rail and carrying the ring rail. The star wheel 46 is herein shown as geared to a vertical shaft 48 supported in the carriage frame 9, which shaft is geared to the horizontal shaft 39 (Fig. 1).

The crank 40 may be rotated to actuate the mechanisms of the doffer, the star wheel 46 serving to keep said mechanisms in step with the spindles; or the machine may be actuated by merely pushing it along the spinning frame, the star wheel 46 being rotated by its engagement with the spindle-bases. If desired, a handle 49 may be attached to the machine at any convenient point.

Figure 3:
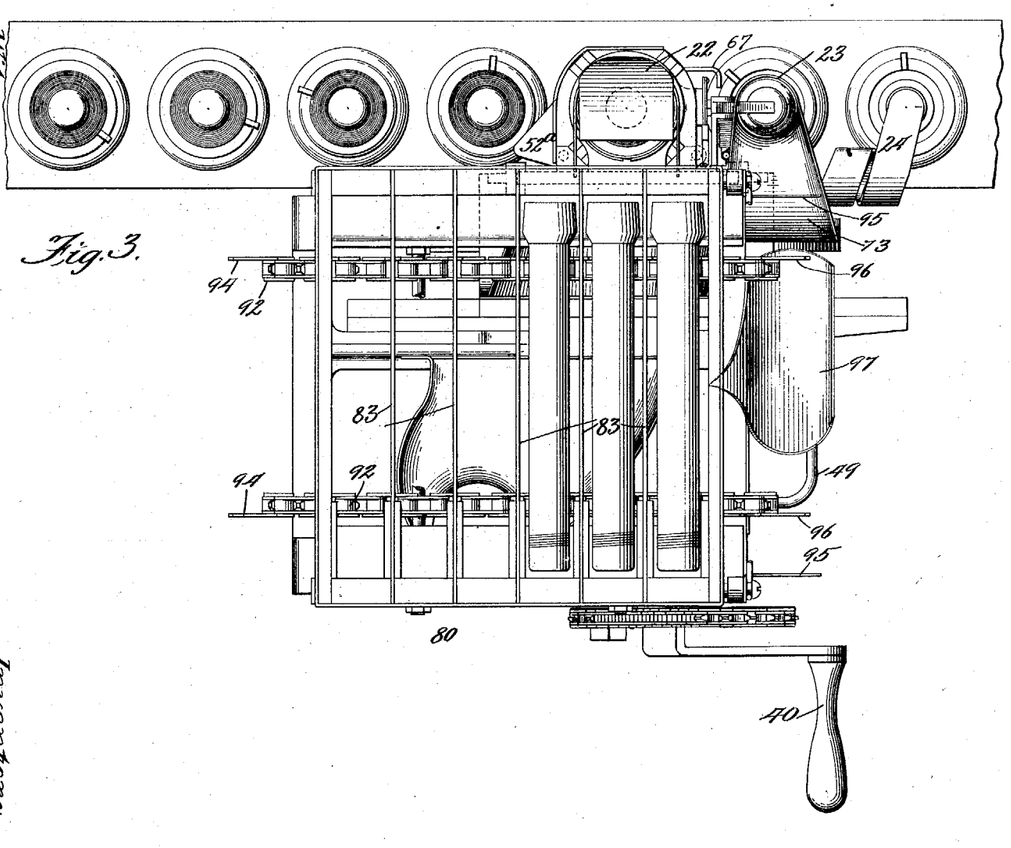
Fig. 3 is a top plan view of the doffer showing its position relative to a ring spinning frame, the lower portion of the doffer not being illustrated.

The doffing tube 22 is fixed to the slide plate 36 by any suitable means, as, for instance, the collars 50 and 51 (Fig. 7) encircling said tube and secured to said slide plate. A shear-supporting member herein shown as in the form of a plate or bracket 52 (Fig. 5) is arranged for movement toward and away from the doffing tube 22. In the present embodiment, the member 52 is supported from said doffing tube for sliding movement relatively to the tube. One method of connecting the member 52 to the doffing tube 22 is to attach said member to a tube $22^b$, as herein shown, said tube $22^b$ telescoping with the tube 22. Preferably means is provided for moving the member 52 downwardly with relation to the tube 22, such as a coiled spring 54, such movement being limited by suitable means, as, for example, hooks 55 on the tube $22^b$ engaging the lower end walls of slots 56 in the tube 22. Upon the lower side of the member 52 are two pins 53 that contact the ring rail when the doffer tube is placed over a bobbin and serve to support the member 52 in proper relation to the bobbin. On the member 52 is a guard or guide extension $52^a$ (Fig. 3) for a purpose to appear hereinafter. The tube 22 carries a means for engaging filled bobbins, while the member 52 supports a thread shear.

Figure 8:
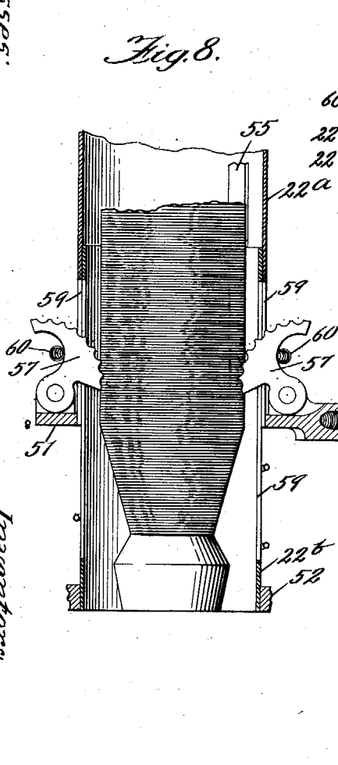
Fig. 8 is a fragmental vertical central section through the doffer tube, illustrating the dogs for gripping a filled bobbin and preventing downward movement of said bobbin in said tube.
Figure 9:
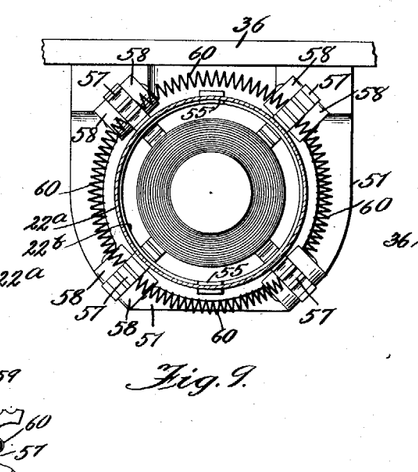
Fig. 9 is a section on line 9—9 of Fig. 5, showing the bobbin-engaging dogs and the springs for holding them in engagement with the thread upon the filled bobbin.

The means just referred to for engaging filled bobbins, in the embodiment herein shown, comprises holding dogs 57 (Figs. 8, 9 and 10) with eccentric gripping faces, said dogs being pivotally mounted between ears 58 upon the collar 51, and extending into the doffer tube through elongated openings 59 in the tubes 22 and $22^b$. The dogs in their downward movement strike against the collar 51, unless previously stopped by engagement with a filled bobbin, and their upward and outward movement is restrained by a coiled spring 60 surrounding the tube 22 and lying just above the ears 58.

Figure 7:
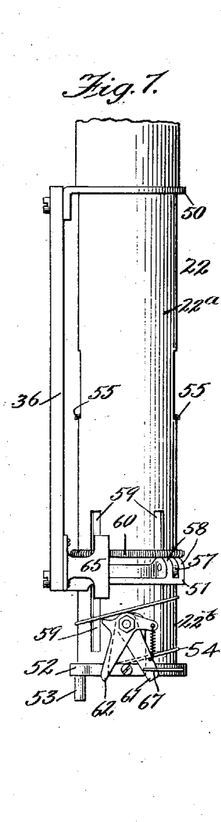
Fig. 7 is a fragmental side elevation of the doffer tube, showing its telescoping foot portion and the thread shear carried thereby.
Figure 10:
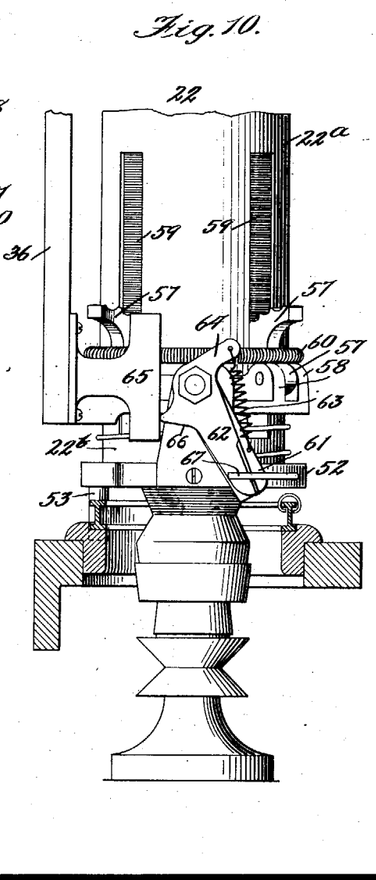
Fig. 10 is an enlarged fragmental view representing the doffer tube in its lowermost position, its foot resting upon the ring rail, and the shear being closed by the relative movement between the foot and the doffer tubes.

The shear, in this instance, comprises a fixed blade 61 immovably attached to the member 52, and a pivotal blade 62 (Figs. 7 and 10). The shear is normally held open by a coiled spring 63 connected at one end with an arm 64 attached to the movable blade 62, and at its other end to a suitable fixed point. The shear, as herein shown, is closed through the relative movement between the tube 22 and the member 52. The slide plate 36 carries an arm 65. When the member 52 is stopped by striking the ring rail 4, the continued downward movement of the slide plate 36 carries the arm 65 into engagement with a finger 66 on the blade 62 and closes the shear. Any preferred means may be employed for preventing threads from fouling upon the shear or other projecting parts carried by the doffer tube; we have herein shown a guard pin 67 fixed to the member 52 and extending in front of the shear (see Figs. 7, 10 and 17).

The upper end of the doffing tube 22 is open at its forward side, and the rear wall of said tube is turned forwardly in order to direct the filled bobbins ejected from the upper end of said tube forwardly into the flaring upper end of a guide tube 68. Said guide tube conducts the doffed bobbins into the box 19. The tube 68 is secured to the carriage frame in any suitable manner. A guide 69 fixed to the slide frame 25 assists in guiding the bobbins from the vertically and horizontally reciprocating doffing tube into the relatively stationary tube 68.

The donning tube 23 is herein shown as fixed to the slide frame 25 by means of collar 70. Means is herein shown for temporarily supporting bobbins in the donning tube, which means in the present instance consists of two springs 71 attached to said tube, the free ends of said springs extending into the lower end of the tube in position to releasably support the butt end of a bobbin. In one side of the tube, and at its lower end, is an opening 72, for a purpose to appear hereinafter. The donning tube has a flaring upper end 73 to receive empty bobbins.

The bobbins are ejected from the donning tube 23 by means herein shown as comprising a dog 74 (Figs. 5 and 6) pivotally supported upon a bracket 75 fixed to the slide plate 36, said dog moving in a vertical slot 76 in the donning tube. The dog 74 is moved into position to engage the tip ends of the bobbins by a spring 77 acting upon an arm 78 fixed with relation to said dog. The spring-actuated movement of said dog is limited by the engagement of the rear end thereof with a stop 79 on the bracket 75. When a bobbin is discharged into the donning tube from the magazine, the dog 74 yields to permit said bobbin to pass it, the descending bobbin being stopped by the springs 71. Upon the next downward movement of the slide plate 36 the dog 74 engages the tip end of the bobbin and ejects the latter from the tube 23.

The bobbin-seater 24, in the present construction, consists of a spring arm fixed to one end of the channel bar 38, the free end of said arm being arranged to press upon the tip of a bobbin placed upon a spindle by the donning tube 23 and the ejector dog 74.

Figure 11:
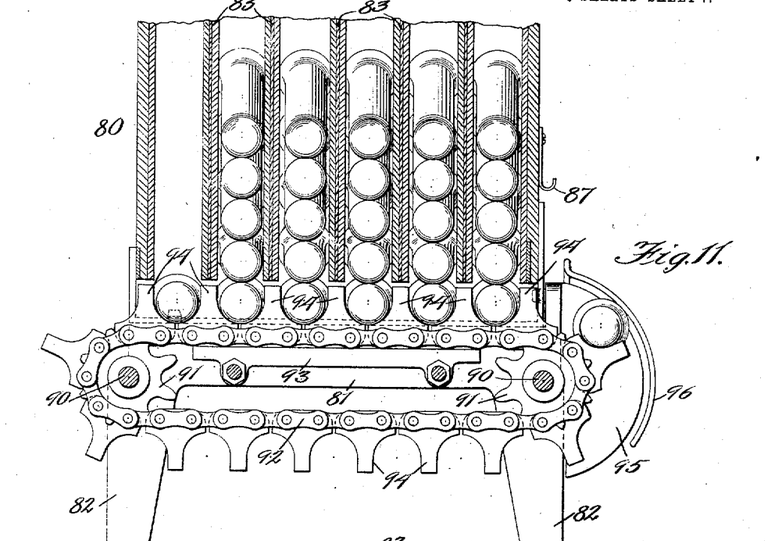
Fig. 11 is a longitudinal vertical section through the magazine for empty bobbins, showing the bobbin-feeding chain by means of which the bobbins are transferred one at a time from said magazine to the donner tube.
Figure 12:
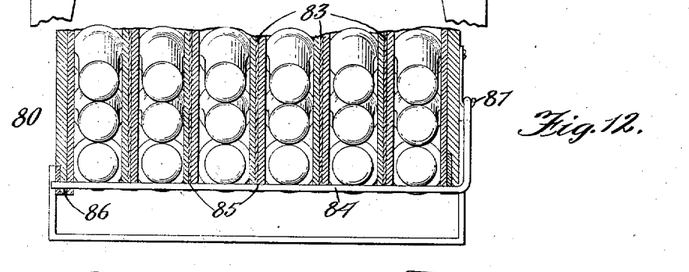
Fig. 12 is a fragmental vertical longitudinal section through said bobbin magazine, showing the removable bail for holding the bobbins in position in the magazine when said magazine is removed from the doffer.
Figure 13:
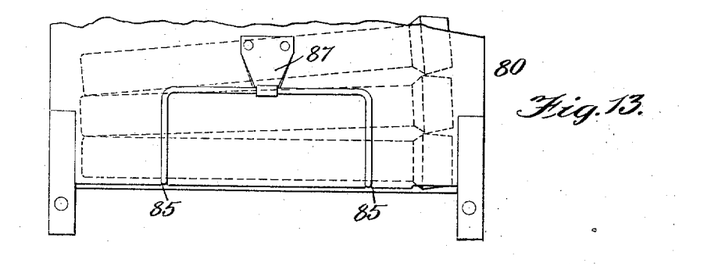
Fig. 13 is a fragmental end view of the lower portion of the removable bobbin magazine showing the projecting end of the removable bail.

Empty bobbins to take the place of those doffed in the operation of the machine may be carried in a magazine 80 (Fig. 11) removably supported upon a frame 81 that is carried by upwardly extending arms 82 above the carriage frame 9. In the form herein shown the magazine 80 is a rectangular receptacle divided into a number of vertical compartments by means of partitions 83, which compartments, when the magazine is in place upon the doffer, are open at top and bottom. Bobbins are placed in the compartments by any suitable means (not shown) in a substantially horizontal position, all of the butts being turned in one direction. When the magazine is being filled, the bobbins are held in place by suitable means, such as a wire bail 84, the two horizontal arms of which are adapted to lie in notches 85 and openings 86 in the lower edges of the receptacle and partitions, said bail being removably held in place by means of an upwardly extending forward portion in loop form which is adapted to be supported upon a hook 87 secured to one side of the magazine. The magazine is secured to the frame 81 by suitable means not herein shown in detail, which means may comprise latches 88 (Fig. 2) pivoted to the frame 81 and engaging pins 89 on the magazine.

Rotatably supported in suitable bearings in the frame 81 are two shafts 90, each carrying two sprocket wheels 91, over which sprocket wheels extend the two endless chains 92. The upper runs of the chains are supported upon rails 93. The chains 92 are of usual construction, save that their pivots are elongated and serve to secure fingers 94 to said chains. The contour of the fingers 94 is such that single bobbins will lie between adjacent fingers upon the upper runs of the chains. Guide plates 95 and guide wires 96 at the discharge end of the magazine direct the bobbins into a chute 97 secured to the upwardly extending arms 82, said chute guiding the bobbins into the flaring upper end 73 of the horizontally reciprocating donning tube. Rotation may be imparted to one of the shafts 90 by means of an endless chain 98 extending over a sprocket wheel 99 on the outer end of said shaft and over a sprocket wheel 100 fixed with relation to a spur gear 101 rotatably mounted upon the carriage 9, said spur gear meshing with a pinion 102 fixed upon the main shaft 39.

It will be seen that the empty bobbins are contained within an instrumentality, namely, the magazine 80; that the bobbins are supported in said magazine by another instrumentality, to wit, the conveyer 92; and that the bobbins are released through the relative movement between said instrumentalities.

When the bobbins upon a spinning frame are ready to be doffed, the machine is stopped with the ring rail in its lowermost position, the usual slack in the portion *a* of the threads extending between the drawing rolls and the traveler having been provided in the same way as is commonly done in hand doffing. The object of providing this slack is to prevent overstraining and breaking of the threads in the subsequent operations. The thread-guide board 5 is then thrown back, and the doffing machine lifted onto the rail 12, the doffing tube 22 being in its elevated position. The filled bobbins may now be replaced by empty ones and said empty bobbins properly engaged with the threads running from the drawing rolls 7 by merely pushing the doffing machine along the spinning frame.

As the doffing tube moves downward over a filled bobbin, the dogs 57 swing outwardly upon their pivots to pass the bobbin. On the upward movement of the tube, the inner roughened faces of the dogs 57 engage the yarn upon the bobbin and cause the filled bobbin to rise with the tube. As the tube is moved down upon successive bobbins, the bobbins previously surrounded by the tube are forced from the upper end of the tube, and being tipped forwardly as they emerge from the upper end of said tube, fall into the guide tube 68, and by means of said tube are directed into the receiving box 19.

Figure 14:
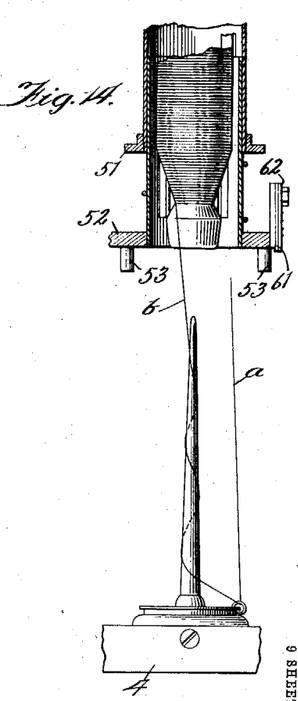
Fig. 14 is a view of the filled bobbin when it is first lifted by the doffer tube.
Figure 15:
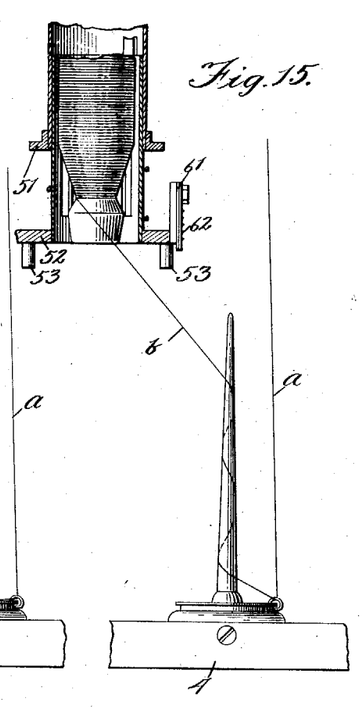
Fig. 15 represents the doffer tube and the removed bobbin as having been fed forward one step in the progress of the machine.
Figure 16:
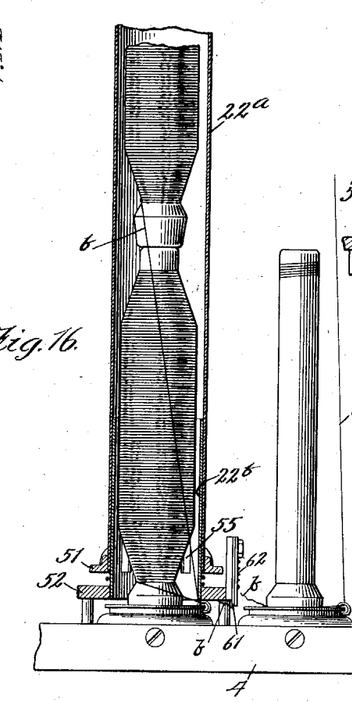
Fig. 16 shows the doffer tube in position upon the next succeeding bobbin, and an empty bobbin placed upon the last preceding spindle, to wit, the one shown in Fig. 15.

Referring now to Figs. 14, 15 and 16: As the bobbin is lifted off its spindle by the tube 22, a few wraps of the portion b of the thread are transferred from the bobbin to the spindle as seen in Fig. 14, so that when the empty bobbin is placed on the spindle the thread will be caught and held by it. As the slide frame 25 is moved forward with relation to the spinning frame, the tube 22 with the bobbin held in its lower end is moved into position over the next adjacent bobbin, the guard or guide 52ª insuring by its plow-like action that the thread running to said bobbin shall not catch upon the upper end of the bobbin and be broken. When the tube 22 is lowered onto the last mentioned bobbin, the thread portion b running from the previously doffed bobbin to the spindle from which it was removed enters the shear and is severed as the doffing tube completes its downward movement. Owing to the circular form of the lower end of the doffing device, the thread portion b assumes a straight line between its spindle and the doffing device, as the latter is moved laterally away from said spindle; consequently said thread portion is in position to enter the open shear as said shear descends. Simultaneously with the descent of the doffing tube and an instant before the shear is actuated, an empty bobbin is discharged from the tube 23 onto said spindle, said empty bobbin clamping the thread between itself and the spindle. The next progressive movement of the slide frame 25 brings the bobbin-seater 24 into vertical alinement with the empty bobbin just referred to, said bobbin-seater in its next downward movement pressing the bobbin firmly onto its spindle. The opening 72 in the side of the donning tube 23 is provided to afford additional clearance between the ejected bobbin and the tube.

In order to make the doffer as light-running as possible, we preferably provide ball-bearings for the various shafts, the supporting rollers and the reciprocating parts.

Certain features of our invention are claimed broadly in application Ser. No. 444,698 filed by us on July 22, 1908.

We would have it understood that we desire not to be limited to the details of construction as herein shown and described, for various modifications will occur to persons skilled in the art.

We claim as our invention:

1. A doffer for spinning frames comprising a carriage, and bobbin-engaging means mounted on the carriage and movable alternately vertically and horizontally with relation to said carriage in the vertical plane of the bobbin spindles.

2. A doffer for spinning frames comprising a carriage, and a doffing device mounted on the carriage and movable alternately vertically and horizontally with relation to said carriage in the vertical plane of the bobbin spindles.

3. In a doffer for spinning frames, a carriage, and means for associating a bobbin with a spindle, said means being mounted on the carriage and being horizontally movable with relation to said carriage in the vertical plane of the bobbin spindles.

4. In a doffer for spinning frames, a carriage, and a bobbin-seater mounted on the carriage and movable horizontally with relation to said carriage in the vertical plane of the bobbin spindles.

5. A doffer comprising a frame; a structure mounted to slide with relation to said frame; a part mounted to slide with relation to said structure; a bobbin-engaging means carried by said part; and means for moving said structure and said part.

6. The combination, with a spinning frame having a row of spindle bases, of a doffer and means for supporting said doffer on the spinning frame for movement longitudinally of said frame, said doffer comprising a framework, a toothed wheel rotatably mounted in said framework, the teeth of said wheel being adapted to engage said spindle bases, bobbin-doffing mechanism supported by said framework, and a driving and timing connection between said wheel and said doffing mechanism, whereby when said doffer is moved along the spinning frame the doffing mechanism will be actuated and properly timed with respect to the spindles.

7. In a doffer for spinning frames, a frame; a structure mounted to slide with relation to said frame; a part mounted to slide with relation to said structure; a bobbin-seater carried by said part; and means for moving said structure and said part.

8. A doffer comprising a frame; a structure mounted to slide horizontally with relation to said frame; a part mounted to slide vertically with relation to said structure; a bobbin-engaging means carried by said part; and means for moving said structure and said part.

9. A doffer comprising a frame; a structure mounted to slide with relation to said frame; a part mounted to slide with relation to said structure; a doffing device carried by said part; a means carried by said structure for associating a bobbin with a spindle; and means for moving said structure and said part.

10. A doffer comprising a frame; a structure mounted to slide with relation to said frame; a part mounted to slide with relation to said structure; a doffing device carried by said part; means carried by said structure for associating a bobbin with a spindle; a bobbin-seater carried by said part; and means for moving said structure and said part.

11. A doffer for spinning frames comprising a carriage, bobbin-engaging means on said carriage, and a rotatable element operatively connected with said bobbin-engaging means for moving said means alternately vertically and horizontally with relation to said carriage in the vertical plane of the bobbin spindles.

12. A machine for placing bobbins upon the spindles of spinning frames comprising a carriage, means on said carriage for associating a bobbin with a spindle, and a rotatable element for horizontally reciprocating said means with relation to said carriage in the vertical plane of the bobbin spindles.

13. In a machine for placing bobbins upon the spindles of spinning frames comprising a carriage, a bobbin-seater on said carriage, and a rotatable element operatively connected with said bobbin-seater for moving the latter vertically and horizontally with relation to the carriage in the vertical plane of the bobbin spindles.

14. A doffer comprising a frame; a structure mounted to slide with relation to said frame; a part mounted to slide with relation to said structure; a bobbin-engaging means carried by said part; and a rotatable element operatively connected with said structure and said part for moving them.

15. A doffer comprising a frame; a structure mounted to slide with relation to said frame; a part mounted to slide with relation to said structure; a bobbin-engaging means carried by said part; a disk having a cam groove therein; means attached to said structure for traveling in said groove; a channel bar attached to said part; and a crank pin carried by said disk and engaging in said channel bar.

16. In a doffer, in combination, a supporting framework having carrying rollers; a timing wheel rotatably supported in the lower portion of said framework; a vertical shaft in said framework having a gear connection with said timing wheel; a horizontal shaft in said framework having a gear connection with said vertical shaft; a rotary actuating member fixed on said horizontal shaft; and doffing mechanism supported by said framework and operatively connected with said actuating member.

17. A doffer comprising operating mechanism, and a rotatable element connected with said mechanism for driving the latter, said element being adapted to engage the spindle-bases of a spinning frame.

18. A doffing device for doffers comprising a reciprocatory tube consisting of two telescoping sections, and a shear carried by said doffing device and actuated by relative movement between said sections.

19. A doffing device for doffers comprising a reciprocatory tube consisting of two telescoping sections, a shear carried by one of said sections and actuated by relative movement between the sections, and bobbin-engaging means carried by one of said sections.

20. A doffing device for doffers comprising a reciprocatory tube having an extension movable with relation to the member, a shear carried by said extension and actuated by relative movement between the sections, and bobbin-engaging means carried by said tube adjacent to said extension.

21. A doffing device for doffers comprising a reciprocatory member having an extension at its lower end, said extension being movable with relation to the member, a shear carried by said extension and actuated by relative movement between the extension and said member, and means carried by said extension for spacing it above the ring rail of a spinning frame.

22. A doffing device for doffers comprising a reciprocatory member having an extension at its lower end, said extension being movable with relation to said member, a shear carried by said extension and actuated by relative movement between said member and said extension, and a guard device carried by said extension in operative relation to said shear.

23. A doffing device for doffers comprising a reciprocatory member having an extension at its lower end, said extension being movable with relation to said member, and a shear actuated by relative movement between said member and said extension.

24. A doffing device for doffers comprising a reciprocatory member having an extension at its lower end, said extension being movable with relation to said member, and a shear carried by said extension, and means on said member for actuating said shear.

25. A doffing device for doffers comprising a reciprocatory member having an extension at its lower end, said extension being movable with relation to said member, and a shear carried by said extension and actuated by relative movement between said member and said extension.

26. In a doffer, in combination, a supporting framework having carrying rollers, a timing wheel rotatably supported in the lower portion of said framework at the rear side thereof, a vertical shaft in said framework having a gear connection with said wheel, a horizontal shaft in said framework having a gear connection with said vertical shaft, a driving crank on the forward end of said horizontal shaft, a rotary actuating member fixed on the rear end of said horizontal shaft, and doffing mechanism supported on the rear side of said framework and operatively connected with said actuating member.

27. In a doffer, in combination, a framework; a structure mounted on said framework for horizontal reciprocation; a part mounted on said structure for vertical reciprocation; a doffer device attached to said part to reciprocate vertically therewith; a donning tube attached to said structure to reciprocate horizontally therewith; a device attached to said vertically reciprocatory part for assisting in the discharge of bobbins from said donning tube; and means carried by said framework for reciprocating said structure and said part.

28. In a doffer, in combination, a framework; a structure mounted on said framework for horizontal reciprocation; a part mounted on said structure for vertical reciprocation; a doffer device attached to said part to reciprocate vertically therewith; a donning tube attached to said structure to reciprocate horizontally therewith; a device attached to said vertically reciprocating part for assisting in the discharge of bobbins from said donning tube; a bobbin-seater attached to said vertically reciprocating part; and means carried by said framework for reciprocating said structure and said part.

29. A reciprocatory doffing device having an extension at its lower end, said extension being movable with relation to said device, a shear carried by said extension, means for opening said shear, and means moving with said device adapted to close said shear.

30. In a doffer, in combination, a supporting framework having carrying rollers; a timing and driving wheel rotatably supported in the lower portion of said framework at the rear side thereof; a vertical shaft in said framework having a gear connection with said wheel; a horizontal shaft in said framework having a gear connection with said vertical shaft; a disk fixed on the rear end of said horizontal shaft; a structure mounted on the rear side of said framework for horizontal reciprocation; a part mounted on said structure for vertical reciprocation; a doffer device attached to said part to reciprocate vertically therewith; a donning tube attached to said structure to reciprocate horizontally therewith, a device attached to said vertically reciprocating part for assisting in the discharge of bobbins from said donning tube; a bobbin-seater attached to said vertically reciprocating part; and operating connections between said disk and the horizontally reciprocatory structure and the vertically reciprocatory part for reciprocating them.

31. In a doffer, a bobbin-magazine, and means moving transversely of the bobbins in said magazine for removing them from the magazine and constantly supporting the bobbins remaining in the magazine.

32. In a doffer, a bobbin-magazine having a plurality of compartments therein, said compartments having open lower ends, and a conveyer moving transversely beneath said compartments and constantly supporting the bobbins remaining in said compartments and adapted to engage and remove bobbins.

33. A doffer comprising a means for engaging a filled bobbin; a conduit for filled bobbins movable with said engaging means; and a relatively stationary bobbin receptacle communicating with the discharge end of said conduit.

34. A doffer comprising a reciprocatory means for engaging a filled bobbin; a tube reciprocating with said engaging means and arranged to receive the bobbins engaged by said engaging means for conducting them away from said engaging means; and a relatively stationary bobbin receptacle communicating with said tube.

35. In a doffer, a stationary bobbin magazine, and an endless bobbin conveyer arranged beneath said magazine, and operating in a direction transverse to the bobbins in the magazine, for removing bobbins from the magazine.

36. In a doffer, a stationary bobbin magazine having an open lower end, and means for removing bobbins from the magazine, said means being arranged beneath said magazine and serving as a bottom for the magazine to constantly support the bobbins remaining in the magazine.

37. A doffer arranged to travel longitudinally of the front of a spinning frame, comprising a framework, operating mechanism carried by said framework, a bobbin-magazine mounted stationarily upon the framework, said magazine having an open lower end, and means beneath the magazine for removing bobbins from the magazine, said means serving as a bottom for the magazine to support the bobbins remaining in the magazine.

38. In a doffer, a framework, a bobbin-magazine, the framework having at its upper end a seat upon which the bobbin-magazine may be removably placed; and means carried by said framework beneath said seat and movable transversely of the bobbins in the magazine for removing them from the magazine.

39. In a doffer, a framework, a magazine having a plurality of bobbin-containing compartments therein, the framework having at its upper end a seat upon which the magazine may be removably placed, and means carried by said framework beneath said seat and movable transversely of the bobbin compartments for removing the bobbins from the magazine.

40. In a doffer, a framework, an elevated bobbin-magazine stationarily supported by said framework, donning mechanism carried by said framework, a tube in said framework leading from a point adjacent to and below said magazine to said donning mechanism, and means for moving bobbins from the magazine to said tube.

41. In a doffer, a framework, a bobbin magazine stationarily supported by said framework, donning mechanism carried by said framework, a tube in said framework leading from a point adjacent to said magazine to said donning mechanism, and a conveyer operating beneath said magazine for removing bobbins from the magazine and placing them in said tube.

42. In a doffer arranged for movement longitudinally of the front of a spinning frame, a framework, an elevated bobbin magazine stationarily supported by said framework, a tube leading from a point near the lower part of the magazine to a point adjacent to and above the line of spindles on the spinning frame, and means for moving bobbins from the magazine and depositing them in the upper part of the tube.

43. In a doffer, a bobbin magazine, means located below the magazine and serving to support the bobbins remaining in the magazine, and means for causing relative movement between the magazine and said means, to release bobbins from said magazine.

44. In a doffer, a carriage arranged for movement longitudinally of the front of a spinning frame; donning mechanism on the carriage; means on said carriage for holding bobbins, said means comprising two instrumentalities, one superposed upon the other, the lower one serving to support the bobbins; means for causing relative movement between said instrumentalities longitudinally of the spinning frame, such movement causing the lower instrumentality to release a bobbin; and means for guiding the released bobbin to the donning mechanism.

45. In a doffer, an instrumentality having spaces therein to contain bobbins, an instrumentality below the other instrumentality to support bobbins in said spaces, and means for causing relative movement between said instrumentalities to effect the discharge of bobbins from said spaces.

46. In a doffer, a carriage arranged for movement longitudinally of the front of a spinning frame; an instrumentality supported by said carriage and having spaces therein to contain bobbins, an instrumentality below the other instrumentality to support bobbins in said spaces, and means for causing relative movement between said instrumentalities longitudinally of the spinning frame to effect the discharge of bobbins from said spaces.

47. In a doffer, a supporting framework; an instrumentality adapted to be removably placed upon said framework and having spaces therein to contain bobbins; and means carried by said framework beneath said instrumentality for supporting bobbins in said spaces.

48. In a doffer, a carriage arranged for movement longitudinally of the front of a spinning frame; donning mechanism on the carriage; means on said carriage for holding bobbins, said means comprising two instrumentalities, one superposed upon the other, the upper one having spaces therein to contain bobbins, the lower instrumentality serving to support bobbins located in said spaces; means for causing relative movement between said instrumentalities longitudinally of the spinning frame to effect the discharge of bobbins from said spaces; and a tube leading from a point near said instrumentalities to a point adjacent to and above the line of spindles on the spinning frame, for receiving the released bobbins and guiding them to the donning mechanism.

49. In a doffer, a vertically reciprocatory bobbin-engaging means adapted to lift a full bobbin off its spindle, and a thread-shear supported for vertical movement relatively to said bobbin-engaging means and actuated by such relative movement.

50. In a doffer, a vertically reciprocatory bobbin-engaging means adapted to lift a full bobbin off its spindle, a thread-shear carried by said bobbin-engaging means and vertically movable with relation to said bobbin-engaging means, and means for actuating said shear through such relative movement.

51. In a doffer, a reciprocatory bobbin-engaging means, a shear-supporting member supported by said bobbin-engaging means for movement relatively to said engaging means, a shear on said member, and means attached to said bobbin-engaging means for actuating said shear.

52. A doffer comprising means for feeding the doffer along the front of a spinning frame, said feeding means comprising a rotatable element adapted to mesh with the spindle-bases of a spinning frame.

HOWARD D. COLMAN.
BURT A. PETERSON.

Witnesses:
A. R. HANSTROM,
L. A. CULVER.

---

Correction in Letters Patent No. 983,858.

It is hereby certified that in Letters Patent No. 983,858, granted February 7, 1911, upon the application of Howard D. Colman and Burt A. Peterson, of Rockford, Illinois, for an improvement in "Doffers," an error appears in the grant requiring correction as follows: In the granting clause, line 3, strike out the words "their successors or assigns" and insert the words *copartners, doing business as Barber-Colman Company, of Rockford, Illinois, their heirs or assigns;* and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.* for movement relatively to said engaging means, a shear on said member, and means attached to said bobbin-engaging means for actuating said shear.

52. A doffer comprising means for feeding the doffer along the front of a spinning frame, said feeding means comprising a rotatable element adapted to mesh with the spindle-bases of a spinning frame.

HOWARD D. COLMAN.
BURT A. PETERSON.

Witnesses:
A. R. HANSTROM,
L. A. CULVER.

---

Correction in Letters Patent No. 983,858.

It is hereby certified that in Letters Patent No. 983,858, granted February 7, 1911, upon the application of Howard D. Colman and Burt A. Peterson, of Rockford, Illinois, for an improvement in "Doffers," an error appears in the grant requiring correction as follows: In the granting clause, line 3, strike out the words "their successors or assigns" and insert the words *copartners, doing business as Barber-Colman Company, of Rockford, Illinois, their heirs or assigns;* and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.*

It is hereby certified that in Letters Patent No. 983,858, granted February 7, 1911, upon the application of Howard D. Colman and Burt A. Peterson, of Rockford, Illinois, for an improvement in "Doffers," an error appears in the grant requiring correction as follows: In the granting clause, line 3, strike out the words "their successors or assigns" and insert the words *copartners, doing business as Barber-Colman Company, of Rockford, Illinois, their heirs or assigns;* and that the said Letters Patent should be read with this correction therein that the same may conform to the record of the case in the Patent Office.

Signed and sealed this 18th day of March, A. D., 1913.

[SEAL.]

C. C. BILLINGS,
*Acting Commissioner of Patents.*